United States Patent [19]

Rösel

[11] 4,325,072

[45] Apr. 13, 1982

[54] WRITING DEVICE CONTROL APPARATUS

[75] Inventor: Hans-Dieter Rösel, Altdorf, Fed. Rep. of Germany

[73] Assignee: Firma J. S. Staedtler, Nuremberg, Fed. Rep. of Germany

[21] Appl. No.: 48,246

[22] Filed: Jun. 13, 1979

[30] Foreign Application Priority Data

Jun. 23, 1978 [DE] Fed. Rep. of Germany ....... 2827718

[51] Int. Cl.[3] ......................... G01D 15/16; B41J 27/00

[52] U.S. Cl. .................................. 346/140 R; 137/539

[58] Field of Search ...................... 346/140 R; 137/539

[56] References Cited

U.S. PATENT DOCUMENTS

| | | | |
|---|---|---|---|
| 1,151,230 | 8/1915 | Wilson | 137/539 |
| 3,065,886 | 11/1962 | Smalley | 346/140 X |
| 3,185,991 | 5/1965 | Gill | 346/140 R |
| 3,371,350 | 2/1968 | Sanderson | 346/140 R |
| 4,204,215 | 5/1980 | Nakarai | 346/140 |

FOREIGN PATENT DOCUMENTS

| | | | |
|---|---|---|---|
| 554308 | 6/1943 | United Kingdom | 346/140 R |
| 707894 | 4/1954 | United Kingdom | 346/140 R |

*Primary Examiner*—Joseph W. Hartary
*Attorney, Agent, or Firm*—Jordan and Hamburg

[57] ABSTRACT

An apparatus for controlling the feed of writing fluid to a writing device comprises a writing fluid supply container, a source of compressed air and a first valve in a first conduit between the source of compressed air and the supply container, the first valve being adjustable depending on the working condition of the writing device. A second valve is provided in a second conduit between the supply container and the writing device, the second valve being automatically self-regulating depending on the pressure of the writing fluid at the writing device, whereby droplet formation is prevented.

6 Claims, 4 Drawing Figures

Fig. 2
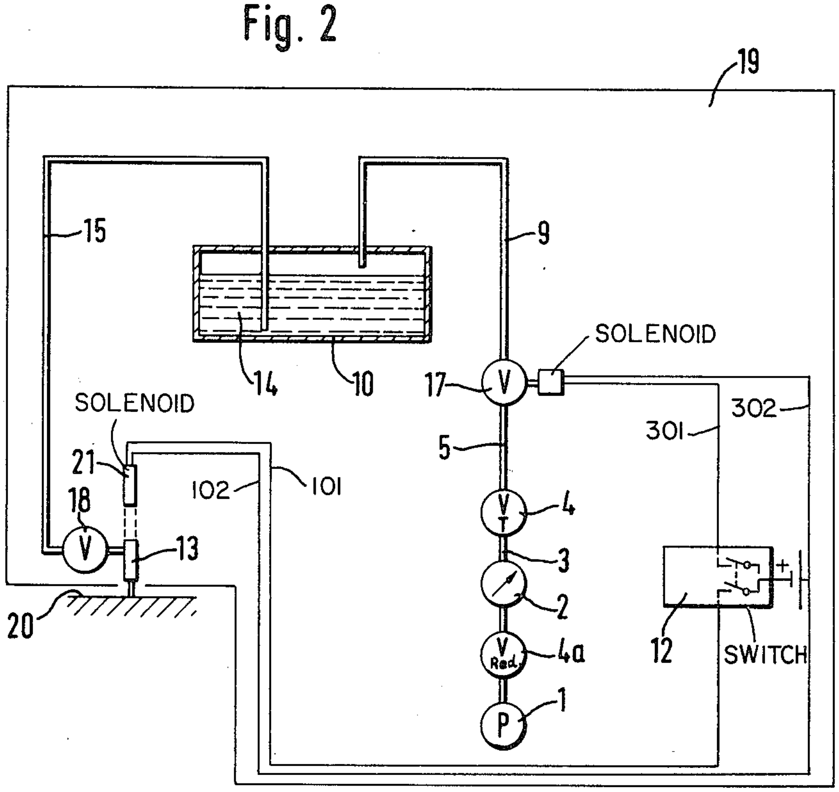
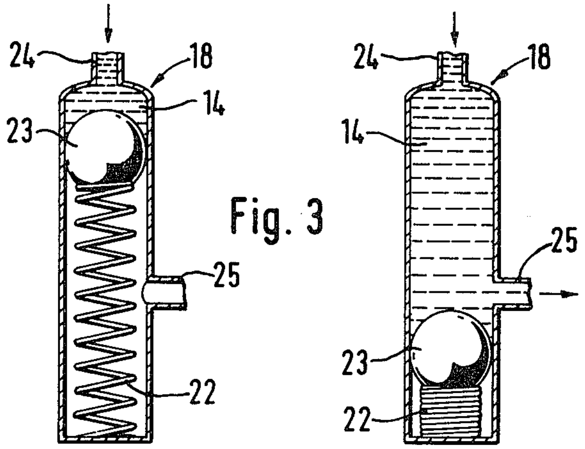
Fig. 3

WRITING DEVICE CONTROL APPARATUS

BACKGROUND OF THE INVENTION

This invention relates to a device for the control of the flow of writing means to a writing mechanism of a mechanical writer utilizing a source of compressed air acting upon the fluid surface of the reservoir for the writing means.

Devices of the aforementioned kind serve to provide a sufficient supply for writing means at the beginning of the writing act and to assure the feed of writing means during the whole writing act in which case frequently also a regulation of the feed of writing means is provided dependent on the writing speed. Such devices also assure that at the end of the writing process the feed of writing fluid be stopped dependably, thus preventing the creation of droplets at the writing device, consisting for instance of a capillary-writer.

Most devices of the kind mentioned provide besides a source of compressed air also a source of suction and a regulating device operating so that pressure acts upon the writing fluid during the writing action and at the end of the writing action, the surface of the writing means or the efflux area of the writing device are connected to a source of suction. These known devices for the regulation of the writing means feed are therefore built expensively, are difficult to build and susceptible to interruptions.

Accordingly, an object of the present invention is to overcome the aforementioned disadvantages of known prior art devices and to provide a device for the regulation of the supply of writing means which utilizes relatively low cost elements of construction and which therefore can be built at an advantageous reduced cost but which, on the other hand, assures reliable regulation of the writing means feed at high safety of running and at minimal down-time due to repairs.

The aforementioned object is achieved by providing a device of the aforementioned kind with a valve adjustable relative to the working condition of the writing device, such valve being located between the source of compressed air and the container for the supply of writing means, and by also providing an escape valve which automatically regulates depending on the pressure of the writing means and which is located between the container for the supply of writing means and the writing device.

This arrangement according to the present invention provides in a simple manner for furnishing writing means immediately at the start of the writing process, in other words, when one working condition changes to another one, by exerting through the valve located between the source of compressed air and the container of supply for the writing means and which valve opens simultaneously therewith, a pressure which propagates within the writing means and which automatically opens an efflux valve. At the end of the writing act, the valve arranged between the source of compressed air and the supply container closes and, due to the thereby reduced pressure, the efflux valve also closes so that the feed of writing fluid to the writing device is interrupted. This arrangement is effective with great safety of operation at a comparably low expense of manufacture.

A particular advantage of the invention is encompassed in one embodiment where an electro-mechanical three-way valve or a high speed venting or deaeration valve, preferably is provided for venting or deaerating between the source of pressure and the supply container for the writing means. Such a valve has two switching or operating positions, in one of which the source of compressed air and the container for the means of writing supply are connected and the exhaust or vent is closed and in the other, the conduit to the source of compressed air is interrupted and the supply container is connected or vented to the atmosphere, thus depressurizing it.

When writing begins the three-way valve is brought to the first position and at the end of the writing, the valve is in the second position. Such rapid vent valves need venting conduits having much larger cross sections than the rest of the conduits so that the pressure drop occurs very fast and with a high speed of flow which will cause a reduction of the static pressure in the vented conduit down to a certain amount below the exterior pressure. That produced pressure, although comparatively small, suffices to act upon the writing means across the supply container for the writing means to force the retraction of the writing means column within the writing device at the moment of the ending of the writing action and thereby guarantees the prevention of a droplet formation.

In this arrangement the escape valve is preferably not actuated by a spring but is brought into position of closure by the reduced or under pressure and the escape valve is held there by the influence of a resistive or frictional force until sufficient writing means pressure actuates its opening. The present invention is effective to obtain its objective by applying negative pressure to the writing device at the end of the writing act without the addition of a special device for the needed regulation and production of under pressure.

In a further embodiment of the invention there may be provided alternatively to the aforedescribed arrangement, an electro-mechanically actuated choke valve located between the source of compressed air and the writing means supply container and also a venting valve actuated by a spring in the direction of closure, where the movable valve body of the venting valve is guided with a close fitting within its chamber at least along part of its stroke.

The valve disposed after the source of compressed air is in this case a simple stop valve, in other words, it is opened at the beginning of the writing act so that the source of compressed air is connected to the supply container for the writing means and closed at the end of the writing act. The spring actuated vent valve also opens against the spring force when the pressure of the writing means mounts while the stop valve is open and allows the writing means to flow out. When the stop valve is shut off interrupting the pressure upon the writing means thereby, the spring of the vent valve forces the valve body back into the closed position, at which time a suction is created upon the writing means column remaining between the vent valve and the exit of the writing device because the valve chamber of the valve body is provided with a close fit. This arrangement also does not require any additional devices for providing under pressure.

Advantageously, the vent valve is arranged directly at or close to the writing device. This results in a maximum efficiency of the valve. The simple construction of the valve permits such a liqht weight construction that it only increases the inertia of the writing device so little that it does not lower its mobility.

The present invention also encompasses the provision of an adjustable throttle-valve between the source of the compressed air and the writing device. Such a throttle-valve is capable of regulating the pressure exerted upon the writing means and thus also the amount of writing means flowing out. In the simplest case the regulation of the throttle-valve relative to the expected speed of writing may be effected manually.

In a further embodiment of the invention an electro-mechanically adjustable throttle-valve is provided and also an adjustment device for the adjusting of the throttle-valve as a function of the particular speed of writing. The adjustment device may for instance regulate the throttle-valve as a function of the rate of rotation of the servomotors which actuate the relative motion between the writing plane and writing device. In that way a constant thickness of lines is assured during the whole writing process.

Finally, there may be provided an electro-mechanical device for lifting and positioning the writing device and an electrical coupling for actuation simultaneously with the valve between the source of compressed air and the writing device. That means that the same switching act which for instance actuates the positioning of the writing device at the start of the writing act also opens the valve between the source of compressed air and the supply container. Conversely, this valve is closed when the writing device is lifted off the writing plane.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 2 is a similar view of another embodiment.

FIG. 3 is a schematic and longitudinal cross sectional view of an escape valve.

DESCRIPTION OF THE PREFERRED EMBODIMENTS

Electrical connections are shown in evenly spaced dashed lines in the accompanying drawings, and the conduits for compressed air and the writing means are shown in dash-dot lines.

Figure 1:
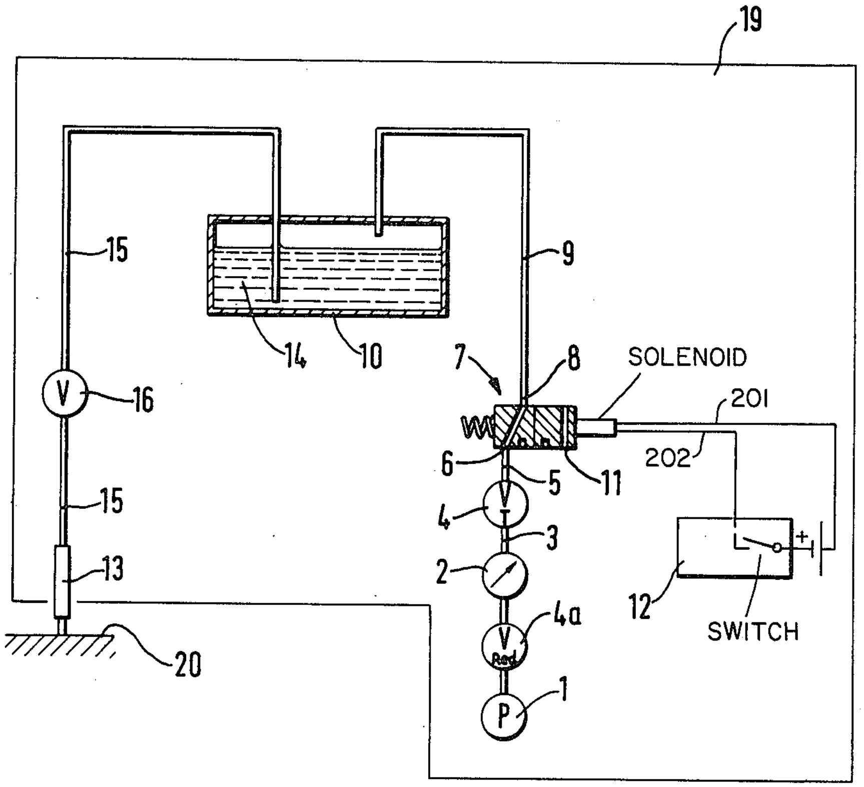
FIG. 1 is a schematic view of a first embodiment of the device according to the present invention.

In the embodiment shown in FIG. 1, there is shown a source of compressed air 1 at the outlet of which a reducing valve 4a and a pressure gauge 2 is arranged. This gauge 2 is connected by a compressed air line 3 to a throttle valve 4 which is able to adjust the pressure. The reducing valve 4a is connected by a conduit 5 to a three-way valve 7, and more particularly to the port 6 of the three-way valve 7. Another port 8 of the three-way valve 7 is connected to a writing means supply container 10 by a conduit 9. The third port 11 of the three-way valve 7 leads to atmosphere.

The three-way valve 7 is inter-related to the working condition of a writing device 13 by means of a switch means 12, in other words, the three-way valve 7 may be a solenoid valve operated by switch means 12, the position of the three-way valve 7 depending on whether the writing device 13 is in its writing or in its resting or non-writing position. Electric wires 201, 202 connect the switch means 12 to the solenoid. When the writing device 13 is in its resting position, the port 8 is connected to the port 11 of the three-way valve 7, and the conduit 9 is thereby vented or deaerated. When the writing device 13 is in a writing position as shown in FIG. 1, the port 6 is connected to port 8 of the three-way valve 7 so that compressed air from the source of compressed air 1 may act upon the surface of the writing means 14 in the writing means supply container 10 which is hermetically closed against the outside.

An escape valve 16 is located in the conduit 15 between the writing means supply container 10 and the writing device 13, such valve 16 opening automatically due to the pressure of the writing means and closing again as a result of reduced pressure caused by the fast venting or deaeration of the conduit 9 through the three-way valve 7, such reduced pressure propagating itself through the writing means 14. The escape valve 16 is kept shut as a result of such reduced pressure and by well defined friction.

In the other embodiment shown in FIG. 2, a valve 17 is located between conduits 5 and 9 and this valve 17 is a choke or solenoid valve which is regulated by the switch means 12 in such a manner that the valve 17 is opened when the writing device 13 is in its writing position and is closed when the writing device 13 rests. An escape valve 18 is disposed immediately close to the writing device 13. The writing device 13 may be lowered into writing position and lifted into resting position by an electro or solenoid device 21. The electro-mechanical device 21 is electrically coupled for actuation to the regulation of valve 17 by means of the switch means 12 and by the electrical wires 101, 102 and 301, 302.

As shown in FIG. 3, the escape valve 18 has a valve body 23 which is biased by a spring 22 in the direction of closure. When valve 17 opens, escape valve 18 also opens due to the pressure exerted by the writing means 14 against the spring 22 so that the writing means 14 may flow out. When the valve 17 closes the escape valve 18 closes automatically due to the force of the spring 22.

It is advantageous to form the escape valve 18 approximately like the one shown schematically in FIG. 3. Thus, in FIG. 3, the ball-shaped valve member 23 is biased by the spring 22 in the direction of its closed position. The valve member 23 is closely fitted in its chamber and is guided along its stroke by the walls of the chamber in which the valve member 23 is disposed as the valve member 23 closes off communication between inlet channel 24 and escape channel 25. The pressure of the writing means 14 forces the valve member 23 from the left-hand closed position shown in FIG. 3 to the right-hand open position shown in FIG. 3, thus creating a free connection or passage between inlet channel 24 and escape channel 25 and allowing the flow of the writing means 14 to the writing device 13. When the pressure of the writing means subsides, the spring 22 presses again the valve member 23 upwardly which produces a reduced or under pressure below the valve member 23 due to its close fitting in its chamber. This reduced pressure causes sucking back of the column of writing means still resting inside the writing device.

Figure 4:
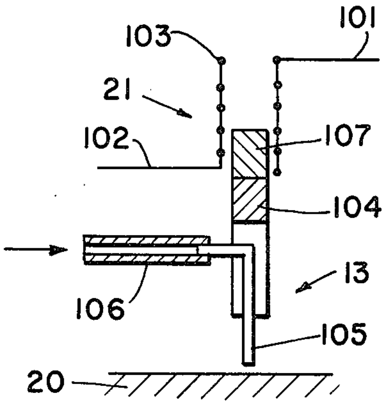
FIG. 4 is a schmatic view of the electro-mechanically operated writing device.

FIG. 4 shows the writing device 13 as it may be used according to the invention. It consists of a so-called capillary writer as it is well known for manual india-ink drawings. It consists substantially of a writing capillary 105 with a relatively small inner diameter, which serves for the application of the writing fluid into the writing base 20. The end 106 of the writing fluid feedline 15 is flexible, for instance made out of a plastic so that line 15 is capable of following the motion of the writing capillary 105. Capillary 105 is connected to an iron core 107 which leads into a guide part. The guide part contains a coil 103 with the feedlines 101 and 102 which lead to the switch means 12 or the source of potential. The switch means 12 in FIG. 2 consists of a double pole switch, actuable by hand, which simultaneously closes the circuit for the writing device 13 and actuates the valve 17. When the coil 103 is supplied with current, the iron core 107 attracted and with it the writing capillary 5 and thereby lifted off the writing base 20. Simultaneously valve 17 is shut.

A reducing valve 4*a* is provided after the source of compressed air 1 and serves to reduce the pressure down to the working pressure. A throttle valve 4 is formed as a throttle-recoil valve and prevents, by controlling the flow, amongst other difficulties, a too rapid pressure rise at the beginning of the writing process and as a result thereof the appearance of a droplet at the point of the writing device. The device may, for example, be disposed in a housing 19.

The device according to the invention may also be used for multiple writing heads for different line strengths or colors.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. In an apparatus for controlling the feed of writing fluid to a writing device comprising a writing fluid supply container, a source of compressed air, a first conduit between said source of compressed air and said supply container, a first valve means in said first conduit, said first valve means being an electro-mechanically actuated stop valve and having a first position corresponding to a writing position which provides communication between said source of compressed air and said supply container and a second position corresponding to a non-writing position which terminates communication between said source of compressed air and said supply container, a writing device, a second conduit between said supply container and said writing device, and a second valve means in said second conduit, said second valve means having an open position allowing writing fluid to pass therethrough when said first valve means is in said first position and said supply container is pressurized by said source of compressed air and having a closed position preventing writing fluid from passing therethrough when said first valve means is in said second position and said communication between said source of compressed air and said supply container is terminated, whereby when said first valve means is in said first position, said writing fluid flows through said second valve means to said writing device and when said first valve means is in said second position, said writing fluid is prevented from flowing to said writing device, said second valve means being an escape valve comprised of a valve body having a cylindrical valve chamber in which a spherical valve member is moveable, said spherical valve member having substantially the same diameter as the diameter of said cylindrical valve chamber to thereby provide a close fit and liquid-closure relationship between said spherical valve member and said cylindrical valve member, and a biasing means biasing said spherical valve member toward a closed direction in said cylindrical valve chamber, said spherical valve member providing said close fit and liquid-closure relationship with said cylindrical valve chamber during at least a part of the movement of said spherical valve member toward said closed direction to thereby create a slight sucking back of the writing fluid within said writing device during said movement of said spherical valve member toward said closed direction.

2. In an apparatus according to claim 1, wherein said first valve means is an electro-mechanically actuated three-way which has a first position which provides communication between said source of compressed air and said supply container and a supply container position wherein said second is vented to atmosphere.

3. In an apparatus according to claim 1, wherein said escape valve is disposed immediately adjacent to said writing device.

4. In an apparatus according to claim 1, further comprising an adjustable reducing valve in said first conduit between said source of compressed air and said supply container.

5. In an apparatus according to claim 1, further comprising an electro-mechanical device for lifting and lowering the writing device relative to a writing plane, and electrical coupling and switch means actuating said electro-mechanical device simultaneously with said first valve means.

6. In an apparatus according to claim 1 wherein said cylindrical valve chamber has an outlet intermediate the longitudinal length of said cylindrical valve chamber to divide said cylindrical valve chamber into an upper portion and a lower portion, said cylindrical valve chamber having an inlet in said upper portion, said biasing means biasing said spherical member toward said upper portion of said cylindrical valve chamber, whereby when said supply container is pressurized, said spherical member is forced by the fluid pressure in opposition to the biasing means into said lower portion to permit writing fluid to flow through said upper portion out through said outlet and when said supply container is vented by said first valve means, said biasing means forces said spherical member past said outlet into said upper portion thereby creating a suction at said outlet and drawing the writing fluid in from said writing device to thereby prevent droplet formation at said writing device when writing is terminated.

* * * * *